April 7, 1942.  W. H. HARRISON  2,278,781
OPTICAL SYSTEM FOR CINEMATOGRAPHY
Filed Feb. 7, 1939  3 Sheets-Sheet 1
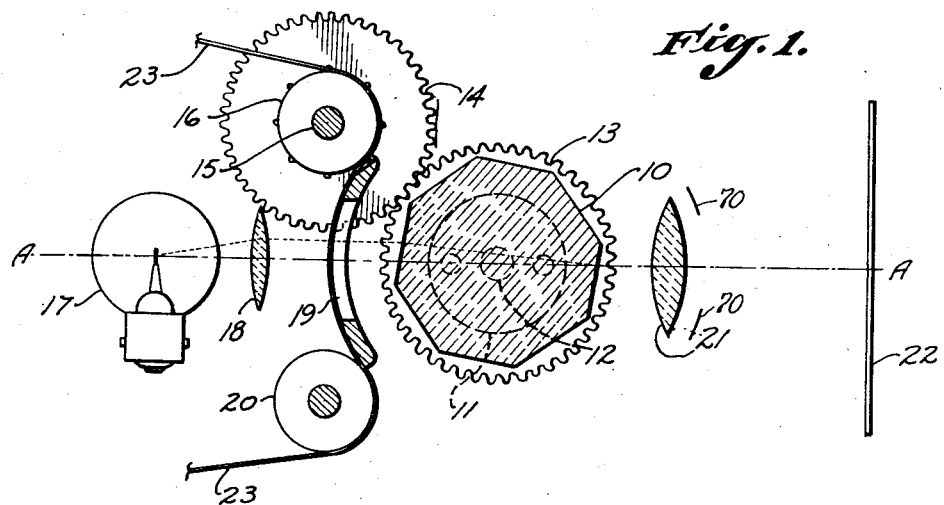
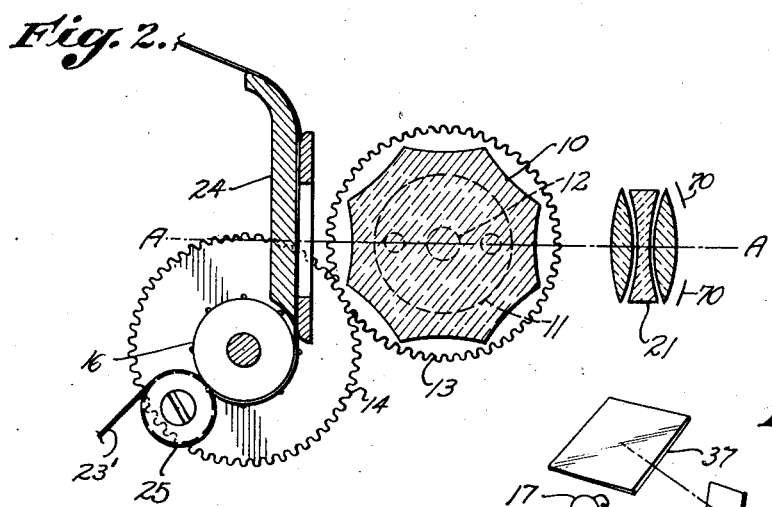
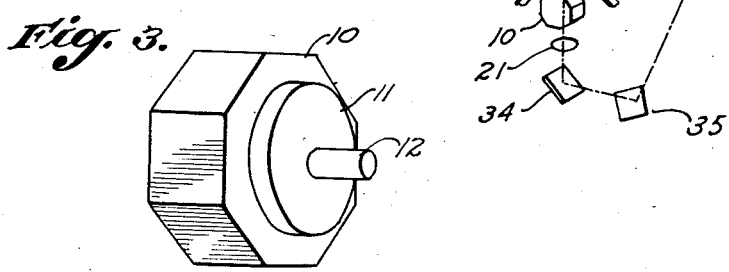
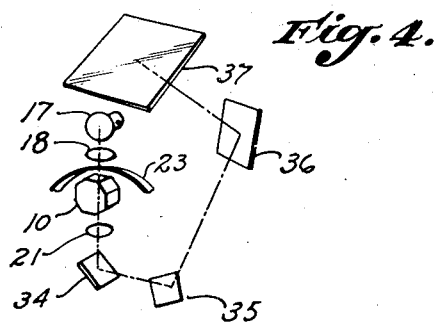
INVENTOR.
William H. Harrison,
BY
ATTORNEY.

April 7, 1942.  W. H. HARRISON  2,278,781
OPTICAL SYSTEM FOR CINEMATOGRAPHY
Filed Feb. 7, 1939  3 Sheets-Sheet 2
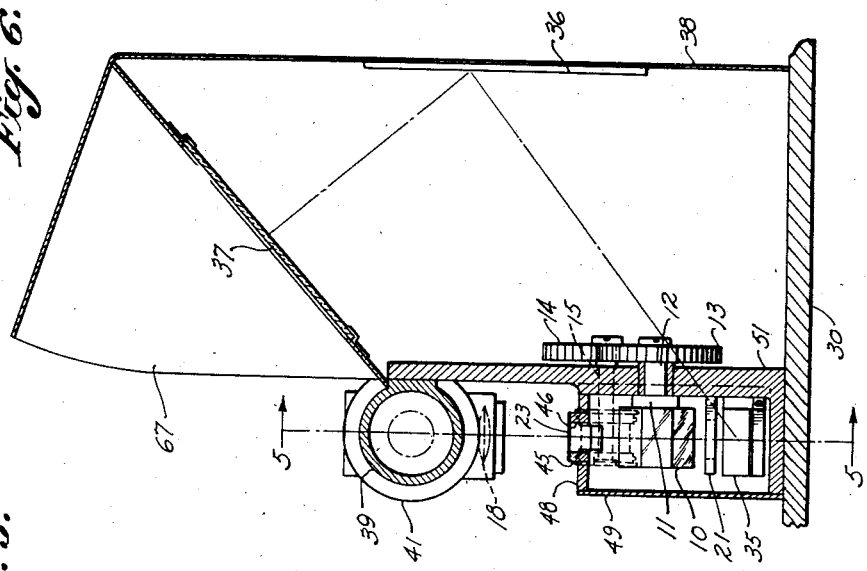
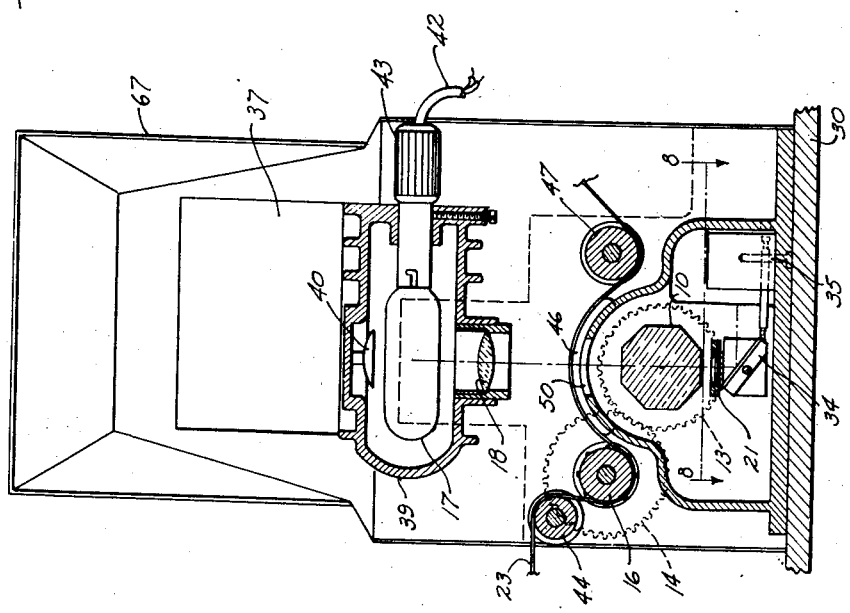
INVENTOR,
William H. Harrison,
BY
ATTORNEY.

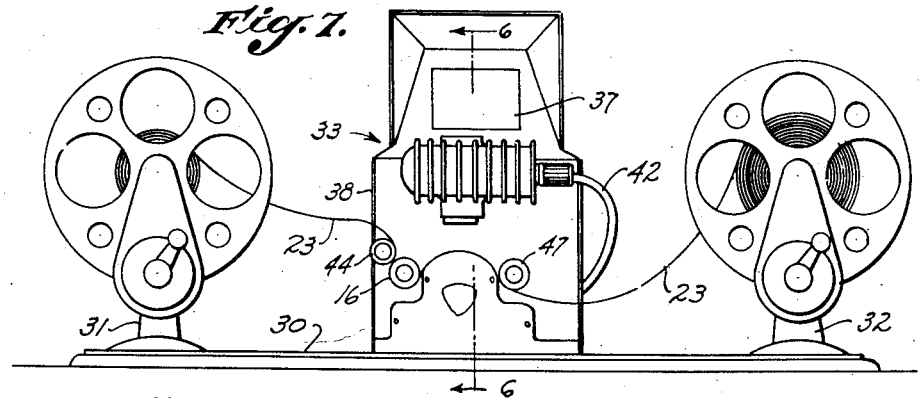
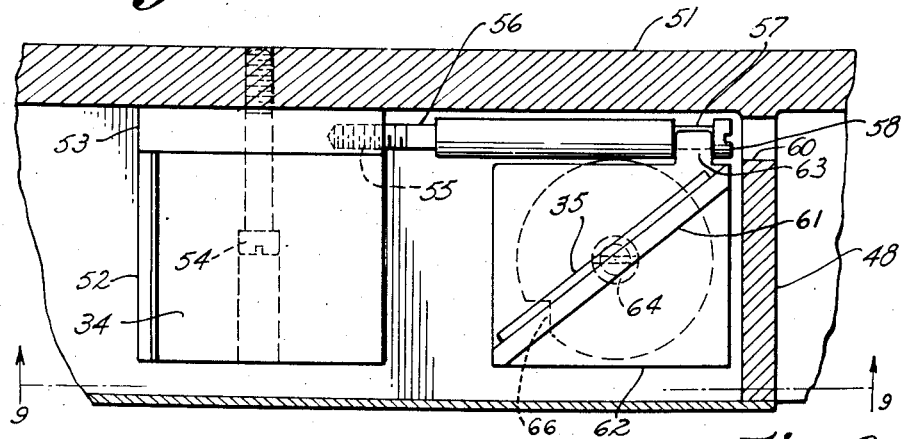
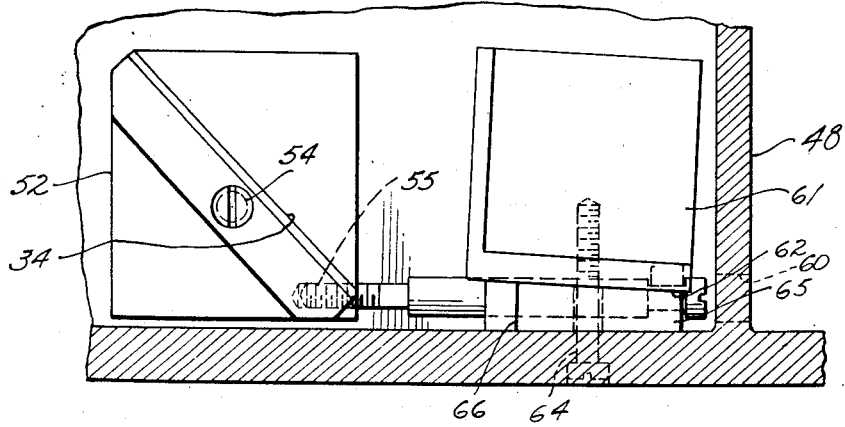
INVENTOR.
William H. Harrison,
BY
ATTORNEY.

Patented Apr. 7, 1942

2,278,781

UNITED STATES PATENT OFFICE 2,278,781

OPTICAL SYSTEM FOR CINEMATOGRAPHY

William H. Harrison, Los Angeles, Calif., assignor, by mesne assignments, to Harrison-Craig Company, a partnership composed of T. R. Craig and William H. Harrison Application February 7, 1939, Serial No. 255,079

4 Claims. (Cl. 88—16.8)

My invention relates generally to optical systems for use in cinematography, and more particularly to optical systems for use with a continuously moving, as opposed to an intermittently moved, film.

The superiority of continuous motion over intermittent motion of film in cinematography has long been recognized, but a satisfactory optical system for use with a continuous motion system has eluded searchers for many years. The advantages of such a system are its mechanical simplicity, the elimination of "loops" on each side of the film gate, and the elimination of stresses tending to tear the sprocket holes and even the film itself when the latter is subjected to its periodic sudden acceleration.

It is an object of my invention to provide an optical system which makes possible the use of a continuous motion film system in various branches of cinematography.

It is another object of my invention to provide such an optical system which has no "dead spots," i. e. periods during which no image is formed on a screen or on the film.

It is a further object of my invention to provide such an optical system which will hold an image stationary on a screen while the film is moving, or maintain an image in the same location on a moving film in a camera.

It is also an object of my invention to provide a small viewing device making use of this optical system which may be used in conjunction with a film rewind of the usual type for use in viewing and editing films.

These and other objects of my invention will become apparent from the following description of a preferred form thereof, and of a device making use of that form, and from the drawings illustrating that form and device, in which:

Fig. 1 is side view of the optical system as applied to a projector,

Fig. 2 is a side view of the optical system as applied to a camera,

Fig. 3 is a perspective view of the polygonal prism used in my optical system.

Fig. 4 is a schematic perspective view of the optical arrangement of my continuous motion viewing device, Fig. 5 is a sectional front view taken at 5—5 in Fig. 6, Fig. 6 is a sectional side view taken at 6—6 in Fig. 7, Fig. 7 is a front elevation of the device, as it is usually mounted on a film rewind base, Fig. 8 is a top view showing the method of mounting the angularly-positioned mirrors, and Fig. 9 is a front view of the mounting shown in Fig. 8.

The fundamental principle on which the operation of my invention rests is the refraction or displacement of a ray of light passing at an acute angle through a piece of glass having parallel plane surfaces. A ray of light entering a piece of glass at an acute angle is refracted or bent so that, while it is passing through the glass, it makes a smaller or more acute angle to a line perpendicular to the surface of the glass. When the ray of light has passed through the glass and emerges from the opposite parallel plane face, the action is reversed; and hence while the entrant and emergent rays are parallel, they are separated by an amount depending upon the thickness of the glass and its index of refraction, according to well-known laws of optics. It is not necessary that the material through which the light passes be glass; other transparent materials, such as artificial plastics, synthetic resins, etc., have a similar ability to refract light to a greater or lesser degree, and they may be used where it seems advisable.

Referring now to the drawings, and particularly to Figs. 1 and 3 thereof, the numeral 10 indicates a prism of a transparent refracting material formed with parallel sides, the one shown being octagonal in shape. A plate 11, on one end of a shaft 12, is attached to the prism 10 by suitable means, such as cementing the two together, so that the prism is centered on the axis of the shaft and rotates with it. A gear 13 on the shaft 12 engages and meshes with a similar gear 14 on a shaft 15, parallel to the shaft 12, and carrying a film sprocket 16 in the same plane as the prism 10. The gears 13 and 14 may be of any convenient size so long as they are of sufficient diameter to permit of easy access to the entire periphery of the sprocket 16 without undue restriction by the prism 10; however, for reasons to be discussed later, it is quite important that these gears have a one-to-one ratio.

While the parts just described are the essential elements of my novel optical system, other elements are necessary to adapt the system to a camera or projector, and accordingly in Fig. 1, which shows one method of adapting the optical system to a projector, I have shown a source of light 17, a condenser lens 18 of the usual type, a film gate 19, an idler roller 20, an objective lens 21, and a screen 22, in addition to the prism and gears previously mentioned.

In this adaptation of my invention, a film 23 passes around the film sprocket 16, across the film gate 19, and around the idler roller 20. The film 23 is pulled past the film gate 19, and its motion turns the sprocket 16, thus driving the gears 13 and 14 and causing the prism 10 to rotate. The prism 10 is adjusted so that when the center of an image on the film 23 is centered on the optical axis A—A of the system, the center of one of the faces of the prism is likewise centered on that axis. The particular form of my invention shown in Fig. 1 is designed for 16 m. m. film which has one pair of sprocket holes per frame; and since I have found it most convenient to use a film sprocket 16 having eight pairs of sprocket teeth around its periphery, I have made the prism 10 in the shape of a regular octagon. Since the gears 13 and 14 have a one-to-one ratio, it follows that each frame of the film 23 will be centered on a face of the prism 10 when both are on the optical axis.

The effect of the rotating prism 10 is to displace, in the manner previously described, the light from a frame of the film 23 not centered on the optical axis A—A, so that after passing through the prism the light from that frame is centered on the optical axis. The dashed line in Fig. 1 indicates the path of a light ray passing through the center of a frame or image on the film not centered on the optical axis; and, as indicated, the prism 10 "rectifies" or displaces the ray of light to the optical axis. I have found that a linear relationship exists between the motion of the film and the angular displacement of the prism until the latter is displaced more than 18° from the optical axis; but above that value, the image, after passing through the prism, appears to slip in the direction of the motion of the film. Stated differently, if the film is moved so that a line drawn between the center of an image of the film 23 and the center of its corresponding face of the prism 10 is parallel to the optical axis A—A, the light passing through the displaced image will emerge from the prism centered on the optical axis. This relationship will hold until the prism has been turned more than 18° from the position where the line joining the centers of two opposite faces of the prism coincides with the optical axis, but above this value, the film appears to slip as previously mentioned.

Since the prism will "rectify" an image up to 18° each side of the optical axis, thus giving a total possible angular displacement of 36°, the ideal prism would be one having at least ten sides. However, I have found that the slight amount of "slip" present in a system using an octagonal prism is not particularly objectionable for many purposes; and by using an octagonal prism, I am able to make use of the standard sprockets now on the market, which have eight pairs of teeth.

In the manufacture of the prism, it is difficult to grind a perfect polygonal block, but not all errors so introduced are equally important. The most important single feature of the shape of the prism is that the opposite faces be parallel in the meridian perpendicular to the axis to avoid such displacement of the light as is caused by a conventional triangular prism. If this displacement is present, the uniform "rectification" of the block is destroyed.

Another error which may be made when grinding the polygonal block is to fail to have all of the central angles subtending the faces of the block equal. However, this variation from the theoretical ideal is not objectionable if the sum of the opposite central angles is equal to 360° divided by one-half the number of sides of the block. In other words, so long as the opposite faces are parallel and the opposite central angles add up as mentioned, satisfactory rectification will be obtained. In the claims, the expression "regular polygonal block" is to be construed as meaning a block formed in the shape of a regular polygon having an even number of sides and at least eight sides around its periphery, the faces forming the opposite sides being parallel.

As the block 10 is rotated, the image appearing on the screen 22 appears to stretch in the direction of the length of the film 23 because of the fact that the rays of light from different points along the length of the film strike the surface of the face of the prism at slightly different angles, and hence some are refracted more than others. As the block 10 is rotated, these angles change and the image on the screen 22 appears to stretch. In many cases this stretch is not objectionable, but when it is, I prefer to form the faces of the block with a slight amount of curvature, as indicated in Fig. 2, where the curvature of the faces is shown greatly exaggerated. The amount of correction is quite small, as may be seen from the fact that with an octagonal block approximately one and one-eighth inches across, and made of a material having an index of refraction of approximately 1.5, the opposite faces are formed so that they have a combined power of approximately —0.25 diopter of cylindrical curvature. The correction applied is cylindrical since the outer edges and the center portion of the film image all follow similar paths with respect to the faces of the block 10, and hence the axis of the cylindrical correction applied is parallel to the axis of rotation of the block.

Since there is no definite mechanical "cut-off" of the film image to insure only one image at a time being shown on the screen 22, the objective lens 21 is provided with a shield 70 so formed that light may pass only through a centrally-disposed aperture whose major axis is parallel to the axis of rotation of the block 10. While the effect is to prevent the film image from appearing on the screen before it is wanted, this result is accomplished by reducing the illumination of the oncoming image, so that it is not bright enough to be seen until it has reached the proper position in the machine. In like manner, the aperture prevents the outgoing image from being visible after it has passed through the proper viewing position. The shield on the lens 21 may take any suitable form, and I have found that an opaque coating on the portion of the lens to be shielded acts very satisfactorily.

While I have shown and described my optical system as it may be applied to a projector, it will be seen that the system may be incorporated in a camera in place of the customary shutter and intermittent motion mechanism. In Fig. 2, I have shown such an adaptation in which parts corresponding to similar parts in Fig. 1 are given corresponding numbers. A prism 10, cemented or otherwise held to a plate 11, is rotated by a shaft 12 on which is mounted a gear 13. The gear 13 engages and meshes with a gear 14 which is driven by a shaft 15 having a film sprocket 16 mounted upon it. A film 23' passes through a gate 24, around the film sprocket 16, and around an idler roller 25 which keeps the film in contact with the film sprocket. The operations of the camera and projector are entirely similar, except for the direction of the light rays, which pass through the film to the screen in the case of the projector, and from the subject (not shown) to the film in the case of the camera.

In both the camera and the projector, and in fact, in all devices making use of this new optical system, it is quite important that the gears 13 and 14 have a one-to-one ratio. In the manufacture of these gears, it quite frequently happens that the teeth are not spaced exactly uniformly around the periphery of the gear, and when this occurs, the motion of the block is not uniform. Similarly, in the manufacture of the polygonal blocks, it is not uncommon to find that the block has a defect of one or more of the types previously described which causes the image to move faster or slower than it should. By assembling the gears and polygonal block so that the error in one compensates for the error in the other, the picture may be held stationary on the screen. If something other than a one-to-one ratio is used in the gears, the error will not repeat at the same regular interval, and it will be practically impossible to ascertain whether the error is introduced by the gears or by the block. If the gears have a one-to-one ratio, the block and gears may be adjusted until their errors compensate each other, without regard to which of the members introduces the error.

In the various adaptations of my invention, I prefer to have the motion of the film 23 drive the sprocket 16, and the latter in turn drive the polygonal block 10. By this method, motion is imparted to the film by other means, not shown, and the only function of the sprocket 16 is to drive the block 10. This tends to eliminate any errors caused by backlash of the gears 13 and 14 and looseness of the sprocket teeth in the sprocket holes of the film. However, if desired, the sprocket 16 may be used as a means of driving the film 23 if such a procedure seems advisable.

As one form of apparatus making use of my novel optical system, I have shown a viewing device adapted for use with a film rewind similar to the conventional rewind and splicing sets now available. By the use of my apparatus, it is possible for several people to simultaneously view a film which is being edited, the film may be run rapidly or slowly as desired, and the particular point at which the cutting or splicing is to be done may be selected while it is visible on the viewing screen.

In Fig. 5, the numeral 30 indicates a base, usually made of wood, on which two rewind standards 31 and 32 are mounted. These rewind standards 31 and 32 may be of the usual types, and I prefer that both of the standards be provided with cranks, so that the film may be run in either direction. Mounted on the base 30 between the rewind standards 31 and 32, I have shown my viewing device 33, preferably so disposed that film passing from a reel on standard 31 to a reel on standard 32 need not be laterally displaced to pass through the viewing device.

In Fig. 4, the optical path of the light is shown in perspective. The light from an incandescent lamp 17 passes downward through a condenser lens 18, through the film 23, is rectified by the polygonal block 10, and passes on downward through the objective lens 21 to an angularly-positioned mirror 34. This first angularly-positioned mirror 34 reflects the light to one side (to the right in the illustration) to a second angularly-positioned mirror 35 from which it is reflected upward, slightly toward the opposite side, and toward the back of the device to a third mirror 36 which reflects the light upward and forward to the viewing screen 37.

Returning now to Figs. 5, 6, and 7, the viewing device 33 is provided with a housing 38 to which is attached a lamp 17 enclosed in a ventilated housing 39. Centered above the filament of the lamp 17 is a reflector 40, and below the filament is a condenser lens 18, all of which are centered on the optical axis of the viewing device. The entire assembly of lamp 17, reflector 40, and condenser lens 18 is preferably mounted in the ventilated housing 39 which I prefer to make of a generally cylindrical shape and provide with fins 41 to aid in dissipating the heat from the lamp. A conductor cord 42 provides means for connecting the lamp 17 to a source of electricity, and a switch-type socket 43 provides means for turning the lamp on and off.

Below the lamp 17 is a film 23 and associated means for moving, guiding, and exposing a portion of it to the light. The film 23 from the reel on the film rewind standard 31 passes over an idler roller 44, around a sprocket 16, over a pair of curved guide bars 45 and 46, and around a second idler roller 47. The first idler roller 44 is located above and to the left of the film sprocket 16 and serves the purpose of keeping the film 23 in contact at all times with a large enough arc of the sprocket, so that there is no possibility of tearing the sprocket holes of the film or allowing the film to become disengaged from the sprocket. The curved guide bars 45 and 46 are preferably formed of a hardened metal, such as a high chromium-content steel, to better withstand the wear on them which naturally results from the dust and grit particles on the film 23 passing over them. These bars 45 and 46 are formed in an arc of a circle whose center is below the bars; and the film 23 follows a path between the sprocket 16 and the guide bars which is tangential to both, and a similar tangential path between the guide bars and the second idler roller 47. The relative position of the sprocket 16, the guide bars 45 and 46, and the idler roller 47 is important, for I have found that by using the positions described, it is not necessary to have a backing or pressure plate above the film 23 to keep it flat; and no matter what the acceleration or deceleration of the film motion, the film 23 remains on the guide bars for their entire length.

The guide bars 45 and 46 are identical and are spaced a distance apart such that only the edges of the film 23 ride on the bars, leaving an unsupported and unobstructed section of film the width of the image thereon. By this method, the need for a backing plate is eliminated; and as a result of this and the edge support of the film, all abrasion and scratching of the image-carrying portion of the film is eliminated.

The guide bars 45 and 46 are preferably supported and held by a housing 48 enclosing the polygonal block 10, the objective lens 21, and the two angularly-positioned mirrors 34 and 35, and a cover plate 49, of a lighter material, closes the front of the housing. That portion of the housing 48 between the guide bars 45 and 46 is cut away for a distance of one frame on each side of the optical axis, and in this way an aperture 50, double the size of a single image of the film 23, is formed.

Located within the housing 48 is the polygonal block 10, centered on the optical axis, and driven through gears 13 and 14 by the film sprocket 16 as previously described. The shafts 12 and 15 are journalled into and supported by the rear wall 51 of the enclosure housing the polygonal block 10.

Below the polygonal block 10, and on the same optical axis, is the objective lens 21, provided with a shield 70 as previously described to prevent the image from being seen until the film is in the proper position; and in this adaptation of my invention, the lens is focussed once and then fixed in position. Below the lens 21, and in line with it, the angularly-positioned mirror 34 is set so that the image from the lens is reflected to the right, where it is again reflected upward, backward, and to the left by the second angularly-positioned mirror 35.

Ideally, the mirrors 34 and 35 would be once properly adjusted and then fixed in that position, but in actual production such a procedure is not usually practical, and in addition, rough handling and jarring in transit may destroy the adjustment. To provide a simple and easily operated means of adjustment, I prefer to mount the mirrors 34 and 35 as shown in Figs. 8 and 9. The mirror 34 is mounted on a block 52, which may be of a generally triangular shape, provided with an enlarged bearing portion 53 which bears against the rear wall 51 of the housing 48. A screw 54, or other suitable holding means, passes lengthwise of the block 52 and into the wall 51, and holds the block in position by reason of the friction between the enlarged bearing portion 53 and the wall 51. To provide an easy means of adjustment, I prefer to provide a tapped hole 55 in the enlarged bearing portion 53 which is preferably perpendicular to the screw 54. In this hole 55, I place a screw 56 which is provided with a peripheral groove 57, adjacent the head 58, formed by the head and an enlarged portion of the shank 59. The end of the screw 56 is threaded to fit into the hole 55, and the head 58 is provided with two slots approximately at right angles to each other. In this way, a screwdriver inserted through an access hole 60 in the side wall of the housing 48 may engage whichever slot in the head 50 of the screw 56 which is more nearly horizontal, and by raising or lowering the head, the mirror 34 will be turned about the screw 54 as an axis.

The mirror 35 is mounted on a block 61, somewhat similar to the block 52 and likewise provided with an enlarged bearing surface 62, but the enlarged bearing surface is provided with a projection 63 which fits into the peripheral groove 57. A screw 64 passes up through the base of the housing 48 and into the block 62, forming an axis about which the block may turn. By turning the screw 56, it moves into or out of the block 52, and this linear motion is transmitted to the block 61 by the projection 63 which fits into the groove 57. In this way, both of the mirrors 34 and 35 may be adjusted by one screw, and when the expression "single screw mirror adjustment" is used in this specification and claims, it is to be understood to refer to the system just described whereby two angularly-positioned mirrors may be adjusted by means of a single screw.

The adjustment of the mirror 34 provides a means for vertically "framing" the picture appearing on the viewing screen 37, and the mirror 35 provides a means for horizontally "framing" the picture; but it sometimes happens that a picture may be properly "framed" vertically and horizontally and still be tilted on the screen. To correct for this, I prefer to provide a wedge-shaped washer 65 between the enlarged bearing portion 62, of the block 61, and the base of the housing 48. By providing a slot 66 at the point of greatest thickness of the wedge 65, the position of the wedge is easily ascertained and its adjustment is facilitated. When a line joining the thickest and the thinnest portions of the wedge 65 is parallel with the reflecting surface of the mirror 35, no angular displacement of the image on the screen 37 is caused by the wedge since the only effect of the latter is to tilt the mirror about an axis perpendicular to its reflecting plane. As the wedge 65 is turned, however, the mirror is tilted forward or back about an axis parallel to the plane of its reflecting surface. Thus, it will be seen, I have provided adjusting means by which both of the angularly-positioned mirrors 34 and 35 may be adjusted so that a properly oriented image will appear on the screen 37.

From the mirror 35, the light passes upward, backward, and to the left until it strikes a mirror 36 located on the inside of the back wall of the housing 38. The mirror 36 is located in an approximately vertical plane, and from it the light is reflected upward and forward to a translucent viewing screen 37 of a suitable material such as ground glass. The screen 37 is set so that it is substantially perpendicular to the central ray of light of the reflected image, and I prefer to place the screen at an angle approximately 45° from the vertical, for in this way the image is easily seen in its proper perspective by the operator. A hood 56 may be provided to eliminate most of the extraneous light falling on the screen 37 and so allow a brighter image to be seen.

By referring to Figs. 5 and 7, it is seen that the optical axis determined by the lamp 17, the condenser lens 18, the aperture 50, the objective lens 21, and the mirror 34 is to one side of the center of the viewing screen 37. By examining the drawing closely, it will be seen that the distance the above-mentioned axis is displaced to the left of the center of the viewing screen 37 is approximately equal to the distance the center of the mirror 35 is displaced to the right of the center of that screen. In this way, it is possible to produce an image on the viewing screen 37 which is rectangular in shape, having no appearance of "keystoning," and still have a very compact unit without any sacrifice of optical efficiency.

To operate the viewing device, the film 23 from the reel on standard 31 is passed over the idler roller 44, underneath the sprocket 16, along the top of the guide bars 45 and 46, under the idler roller 47, and to the reel on standard 32. The lamp 17 is lighted by movement of the hand grip of the socket 43, and the image of the film then appears on the screen 37. If the film used is of the type having one pair of sprocket holes per frame, such as the present 16 m. m. film, the image appearing on the screen 37 will of necessity be properly framed if the viewing device is properly adjusted. However, if the film is one having a number of pairs of sprocket holes per frame, such as the present 35 m. m. film, it may be necessary to shift the position of the film on the sprocket 16 in order to "frame" the image properly on the screen 37. The film having been threaded around the rollers 44 and 47, sprocket 16, and the guide bars 45 and 46, the viewing device is operated by turning the crank of the standard 32, so as to wind the film onto the reel thereon. Since the speed of the polygonal block 10 is determined by the speed of the sprocket 16, and since the latter is driven by the motion of the film 23, the film may be run rapidly or slowly as the operator desires, remaining under his direct control at all times. Thus, as the operator approaches a point in the film that he wishes to examine, he may run the film more slowly until he reaches that point; and upon reaching it, he may mark or otherwise indicate the particular frame of film shown on the screen 37 without having to remove the film from the viewing device. In this way, there is no possibility of marking the wrong frame; and when the film has been marked, it may be removed from the viewing device for cutting, splicing, or similar operations without having to open gates, unlatch pressure plates, etc. When the film has been spliced or otherwise worked on, it may quickly and easily be returned to its former position in the viewing device and the viewing of the film continued.

In this way, films may be edited quickly, accurately, and comfortably, while having an enlarged image of the film in view of the operator; and if a splicing block (not shown) is mounted on the base 30, complete and yet compact facilities are conveniently assembled for the editing of films.

While I have shown and described a preferred form of my optical system, and have shown and described the preferred adaptation of that form as it may be embodied in a viewing device, it will be apparent that modifications may be made in design and form, which in no way change the fundamental principles I have shown and described herein.

I claim as my invention:

1. A film viewing device which includes: an optical system for continuous motion cinematography which includes: a lens; film guiding means; means defining an aperture past which film is directed by said film guiding means; a regular polygonal block of a transparent refractive medium, formed so that the sum of opposite central angles equals 360° divided by one-half the number of sides, said polygonal block being rotatably mounted between said lens and said aperture so that it may rotate about an axis passing through its center and perpendicular to both the optical axis of said lens and the direction of motion of said film; a film sprocket engaging said film; and a gear train having a one-to-one ratio, causing said polygonal block to rotate at the same angular velocity as said film sprocket, an idler roller to maintain contact of film on said sprocket; said film guiding means being formed as a pair of parallel guide bars defining said aperture between them, said guide bars being curved in an arc of a circle in the direction of said film motion; a second idler roller, said film sprocket and said second idler roller being located so that the path of said film is tangential to both said sprocket and said guide bars and tangential to both said guide bars and said second idler roller; a light source; an angularly-positioned mirror; a second angularly-positioned mirror; a single screw mirror adjustment for positioning said angularly-positioned mirrors; a wedge-shaped washer adapted to provide additional adjustment for said second angularly-positioned mirror; a reversing mirror; a viewing screen; and an axis defined by said light source, said aperture, said polygonal block, said lens, and said first angularly-positioned mirror displaced a distance equal and opposite to the distance the center of said second angularly-positioned mirror is displaced from the axis of said viewing screen.

2. A film viewing device which includes: a lens; film guiding means comprising a pair of parallel guide bars defining an aperture between them, said guide bars being curved in an arc of a circle in the direction of the film motion; a regular polygonal block of a transparent refractive medium rotatably mounted between said lens and said aperture so that it may rotate about an axis passing through its center and perpendicular to the optical axis of said lens and the direction of motion of said film; a film sprocket engaging said film; a gear train having a one-to-one ratio, causing said block to rotate at the same angular velocity as said film sprocket; an idler roller to maintain contact of said film on said sprocket; a second idler roller, said film sprocket and said second idler roller being located so that the path of said film is tangential to both said sprocket and said guide bars and tangential to both said guide bars and said second idler roller; a light source; an angularly-positioned mirror; a second angularly-positioned mirror; a single screw mirror adjustment for positioning said angularly-positioned mirrors; a wedge-shaped washer adapted to provide additional adjustment for said second angularly-positioned mirror; a reversing mirror; and a viewing screen; the axis defined by said light source, said aperture, said polygonal block, said lens, and said first angularly-positioned mirror being displaced a distance equal and opposite to the distance the center of said second angularly-positioned mirror is displaced from the axis of said viewing screen.

3. A film viewing device which includes: a lens; film guiding means defining an aperture aligned with said lens; a regular polygonal block of a transparent refractive medium rotatably mounted between said lens and said aperture; a film sprocket geared to said block with a one-to-one ratio; a pair of idler rollers cooperating with said sprocket and guide means to lead said film past said aperture in contact with said guide means; a light source; an angularly-positioned mirror; a second angularly-positioned mirror; a single screw mirror adjustment for positioning said angularly-positioned mirrors; a wedge-shaped washer adapted to provide additional adjustment for said second angularly-positioned mirror; a reversing mirror; and a viewing screen, the axis defined by said light source, said aperture, said polygonal block, said lens, and said first angularly-positioned mirror being displaced a distance equal and opposite to the distance the center of said second angularly-positioned mirror is displaced from the axis of said viewing screen.

4. A film viewing device which includes: a lens; film guiding means defining an aperture aligned with said lens; a regular polygonal block of a transparent refractive medium rotatably mounted between said lens and said aperture; a film sprocket geared to said block with a one-to-one ratio; a pair of idler rollers cooperating with said sprocket and guide means to lead said film past said aperture in contact with said guide means; a light source; an angularly-positioned mirror; a second angularly-positioned mirror; a single screw mirror adjustment for positioning said angularly-positioned mirrors; a wedge-shaped washer adapted to provide additional adjustment for said second angularly-positioned mirror; a reversing mirror; and a viewing screen.

WILLIAM H. HARRISON.